April 7, 1959 A. SAMBRAUS 2,880,877
CLARIFICATION PLANT FOR SERVICE AND WASTE WATERS
Filed Nov. 21, 1955

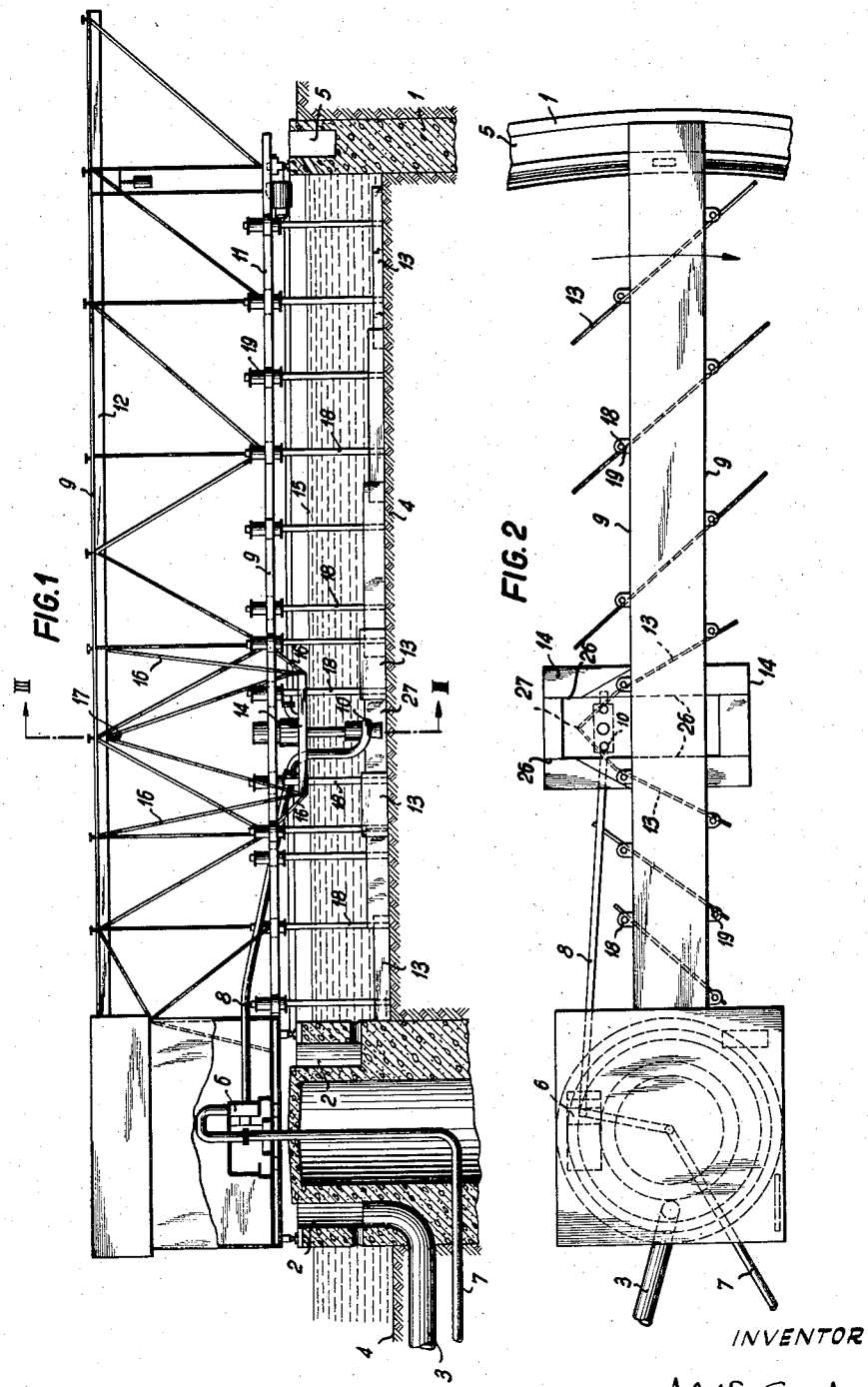

INVENTOR
Adolf Sambraus

United States Patent Office 2,880,877
Patented Apr. 7, 1959

2,880,877
CLARIFICATION PLANT FOR SERVICE AND WASTE WATERS

Adolf Sambraus, Luneburg, Germany

Application November 21, 1955, Serial No. 548,189

Claims priority, application Germany November 19, 1954

4 Claims. (Cl. 210—530)

This invention relates to plants for the mechanical clarification of fluids, service water and waste water, particularly of sugar factories, crude oil refineries, industrial and municipal plants. Clarification plants generally consist of a circular basis to the centre of which are supplied the amounts of fluid to be clarified and from the outer periphery of which the clarified fluids are taken after the suspended matter carried along with the fluid has settled.

Principally when used for sugar factories, a classifier is connected in front of such a clarification plant, for the purpose of separating rapidly sinking substances, such as sand and sugar-beet ends. In clarification plants of this kind, after the slowly sinking sludge-forming substances have been pushed together to form a pile by means of a girder bridge, which extends from the centre of the basin to the edge thereof and which rotates slowly above the basin and which is provided with scrapers adapted to being lifted out of the fluid, said substances are pumped away by a thick-sludge pump provided on the aforesaid bridge, through another thick-sludge pump disposed in the centre of the plant.

When the bottom of the basin is approximately horizontal and does not have a channel for the sludge which has been pushed together and from which channel the pump pumps off the thick sludge, according to the invention the arrangement of the pump platform directly above the level of the fluid necessitates a special construction of the scrapers adjacent to the platform for the formation of the pile of sedimentary matter in the region of the thick-sludge pump, since these scrapers together with the others must, for operational reasons, be capable of being raised to above the level of the fluid. An extension of these two scrapers (usually at an acute angle) up to their point of intersection—which is necessary for the formation of the ramparts—is out of the question, because it would then be impossible to raise the scrapers as they would collide against the girders of the pump platform. The invention allows for this fact in the following way: the two scrapers which are adjacent to the pump platform and the upper edges of which are situated at the highest level, when the scraper system is lowered, in relation to the scrapers the height of which successively decreases towards the edge of the basin and the centre thereof, are detachably connected together at their ends which are directed towards one another, by means of a sheet-metal angle or the like which forms a kind of a sludge-catching basket.

In order that the invention may be more readily understood, reference is made to the accompanying drawings which illustrate diagrammatically and by way of example one embodiment thereof, and in which:

Figure 1 is a side view of the plant, partly in elevation and partly in section;

Figure 2 is a top plan view;

Figure 3:
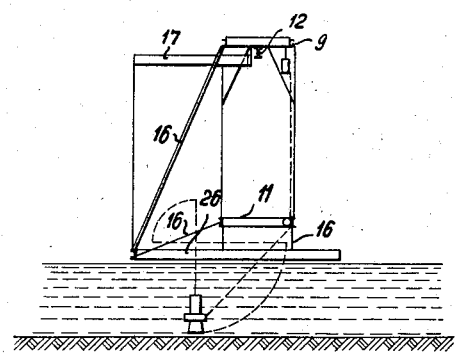
Figure 3 is a section along the line III—III in Figure 1.

1 is the annular outer wall of the clarifier basin, having a substantially horizontal bottom, and to which the waters to be clarified are supplied from the centre through the passage 2 and supply pipe 3 beneath the bottom 4 of the basin. After deposition of the suspended matter, the liquid is discharged in the clarified state through an annular passage 5. The thick sludge is removed by means of a pump 6 in the pump house through a pipeline 7. The thick sludge is supplied to the pump 6 through a pipeline 8 by means of rockable pump 10 disposed on the rotatable bridge 9. The bridge 9 in the form of a girder system having parallel chords is, as shown in Figure 3, substantially free from constructional elements in the interior and it is therefore easy to walk along it owing to the provision of the catwalk 11. At the top of the girder system is provided a continuous trolley travel rail 12, on which the pump unit 10 and pump house equipments can be transported. The rocking pump 10, into the range of which is led the suspended matter pushed together by scrapers 13 to form a rampart, is disposed with its rocking mountings on a pump platform 14 below the girder system of the bridge 9 at a slight distance above the highest fluid level 15 in the basin. This platform lies with the longitudinal direction transversely to the bridge and extends beyond the bridge structure at the sides, so that work on the pump can be carried out without obstruction. The platform is suspended from the bridge girder system by means of struts 16. At the top, above the platform but below the trolley travel rail 12, is disposed a trolley travel rail 17, so that the pump 10 can be slung over from the block and pulley of the rail 17 onto the block and pulley of the rail 12, and vice-versa, and especially with its axis in the horizontal position.

Figure 4:
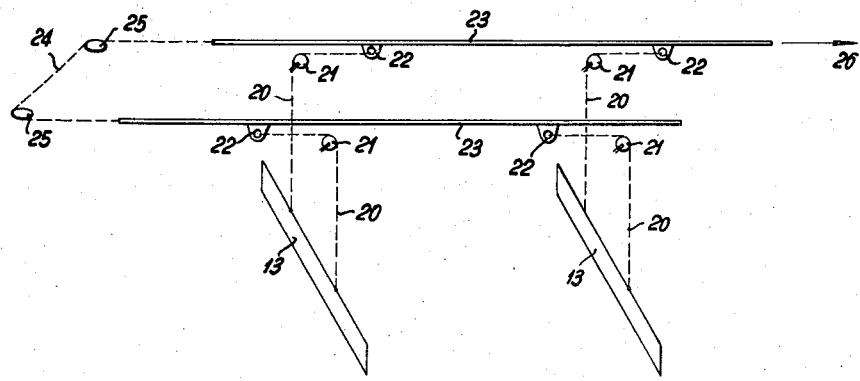
Figure 4 is a diagrammatic representation of the mechanism for lifting the scrapers.

The two scrapers 13 which are adjacent to the platform 14 and which are preferably at an acute angle to one another, have the greatest height in comparison with the other scrapers, as is seen in Figure 1. The scrapers gradually diminish in height towards the edge of the basin and the centre thereof. Each scraper 13 is fastened on two rods or the like 18, which can slide in a vertical direction in tubular guide pieces 19. The scrapers are held at an adjustable height by chains or ropes 20 (compare Figure 4), which are passed over roller 21 fixed on the bridge and which in each case are attached at 22 to holding means in the form of rods 23 and/or chains or ropes 23. The holding means 23 are deflected over rollers 25 by a chain 24 or the like and are held or pulled by tractive means (not illustrated) for example in the form of a winch, a rack and pinion drive, block and pulley, or the like. In order to ensure that the elevating chains or ropes 20 do not obstruct one another when the scrapers 13 are raised uniformly, it is possible to place two pull rods side by side, instead of one pull rod 23, and to connect them jointly to the chain or rope 24 and to attach the chains or the like 20 alternately at 22 to the rods 23 which are disposed side by side. With such a construction it is possible to adjust the height of all the scrapers jointly but also, when the bridge is constructed on the sectional assembly system, to operate groups of scrapers 13 separately. It would also be possible for each scraper to be operated individually.

Since the longitudinal girders 26 of the platform 14 which are rigidly connected to the girder system of the bridge are situated closely above the level of the fluid, and the scrapers 13 adjacent to the platform must be capable of being lifted completely out of the fluid, there is not sufficient room for these scrapers, when they are raised out of the fluid, for them to be extended for example as far as their intersection at the vertex of the angle. Such an extension is out of the question, because the girders 26 would be in the way. It is necessary to bring the rampart of suspended matter into the range of the pump 10 for which purpose one length of the said scrapers up to the angle vertex could provide a means. Since this extension is not possible owing to the platform girder 26, the scrapers have to be shortened, but this would in turn have the consequence of too large a space between the converging ends of the scrapers. This intermediate space is now bridged by a plate in curved form or preferably angle form, which forms a sludge-catching basket 27 and which is detachably joined to the converging scraper ends. The space round the pump is thus free after removal of the sludge-catcher 27 and the scrapers can be lifted laterally past the girders 26, so that they in this way completely emerge from the water.

I claim:

1. In a clarifier arrangement incorporating a tank and a scraper device supporting bridge arranged above said tank and mounted for movement relative thereto, the improvement comprising, a plurality of scraper elements, each of said scraper elements including at least one substantially vertical stem portion; mounting means mounting said scraper elements on said bridge for substantially vertical sliding movement relative thereto, said mounting means including a plurality of substantially vertically directed tubular members and adapted to slidably receive the stem portions of said scraper elements respectively, said scraper elements being limited to a vertical slidable movement by means of said mounting means; and common operating means for raising and lowering said scraper elements in unison.

2. The combination defined in claim 1 wherein said operating means include a plurality of hoisting cables attached to said elements, respectively, and a hoisting element attached to said cables.

3. The combination defined in claim 2 wherein said operating means include a plurality of pullies mounted on said bridge and operatively associated with said hoisting cables, respectively, for converting substantially vertical movement of said cables, during raising and lowering of the respective elements, into substantially horizontal movement.

4. In a clarifier arrangement incorporating a tank and a sludge pump device and scraper device supporting bridge arranged above said tank and mounted for movement relative thereto, the improvement comprising a support platform connected to said bridge and projecting laterally therefrom; a sludge pump device arranged on and carried by that portion of said support platform which projects laterally from said bridge; a plurality of scraper elements; mounting means mounting said elements on said bridge for substantially vertical sliding movement relative thereto; and common operating means for raising and lowering said scraper elements in unison.

References Cited in the file of this patent

UNITED STATES PATENTS

| 673,577 | Jewell | May 7, 1901 |
| 1,916,460 | Bousman | July 4, 1933 |
| 2,062,988 | Callow | Dec. 1, 1936 |
| 2,064,497 | Sayers | Dec. 15, 1936 |
| 2,236,128 | Poole | Mar. 25, 1941 |
| 2,370,120 | Bousman | Feb. 27, 1945 |
| 2,427,091 | Durdin | Sept. 9, 1947 |
| 2,443,686 | Malmgren | June 22, 1948 |

FOREIGN PATENTS

| 685,544 | Great Britain | Jan. 7, 1953 |